(12) United States Patent
Zeng et al.

(10) Patent No.: US 11,703,405 B2
(45) Date of Patent: Jul. 18, 2023

(54) DAMAGE IDENTIFICATION METHOD BASED ON CABLE FORCE TESTS OF CABLE SYSTEM AND TEST ERROR SELF-ADAPTIVE ANALYSIS

(71) Applicants: Central Research Institute of Building and Construction CO., LTD. MCC, Beijing (CN); China Jingye Engineering CO., LTD, Beijing (CN)

(72) Inventors: Bin Zeng, Beijing (CN); Qing Xu, Beijing (CN); Man Xu, Beijing (CN); Yanchao Shao, Beijing (CN)

(73) Assignees: CENTRAL RESEARCH INSTITUTE OF BUILDING AND CONSTRUCTION CO., LTD. MCC, Beijing (CN); CHINA JINGYE ENGINEERING CO., LTD, Beijing (CN)

( * ) Notice: Subject to any disclaimer, the term of this patent is extended or adjusted under 35 U.S.C. 154(b) by 0 days.

(21) Appl. No.: 17/941,619

(22) Filed: Sep. 9, 2022

(65) Prior Publication Data

US 2023/0003595 A1  Jan. 5, 2023

Related U.S. Application Data

(63) Continuation of application No. PCT/CN2021/136963, filed on Dec. 10, 2021.

(30) Foreign Application Priority Data

Feb. 23, 2021 (CN) .......................... 202110204453.6

(51) Int. Cl.
*G01L 5/04* (2006.01)
*G01L 5/105* (2020.01)

(52) U.S. Cl.
CPC .............. *G01L 5/042* (2013.01); *G01L 5/105* (2013.01)

(58) Field of Classification Search
CPC ...................................... G01L 5/105
See application file for complete search history.

(56) References Cited

U.S. PATENT DOCUMENTS 4,927,263 A * 5/1990 de Groot ................. G01S 17/87
356/342

FOREIGN PATENT DOCUMENTS

| CN | 101936795 A | 1/2011 |
|----|-------------|--------|
| CN | 102519651 A | 6/2012 |

(Continued)

OTHER PUBLICATIONS

International search report of PCT/CN2021/136963, 5 pages, dated 2021.

*Primary Examiner* — Kevin Quarterman
*Assistant Examiner* — Omar H Nixon
(74) *Attorney, Agent, or Firm* — Muncy, Geissler, Olds & Lowe, P.C.

(57) ABSTRACT

A damage identification method based on cable force tests of a cable system and test error self-adaptive analysis is proposed to measure cable forces in prestressed steel structures and find out possible damage positions of the cable system. The method includes placing a laser velocimeter; measuring the vibration speed history data of the measuring point P on the cable by the laser velocimeter; calculating the cable force; calculating all the cable forces of the cable system through the same procedure; analyzing error between cables and finding out the possible damage of the cable or of the tie rod connected to the cable. The dynamic response characteristics of both in-plane and out-of-plane of a cable can be obtained through the method of the present invention. The self-verified more accurate results can be obtained, and the (Continued)

damage in a cable system can be determined according to error self-adaptive analysis.

9 Claims, 3 Drawing Sheets

(56) References Cited

FOREIGN PATENT DOCUMENTS

| | | | |
|---|---|---|---|
| CN | 103913512 | A | 7/2014 |
| CN | 106932135 | A | 7/2017 |
| CN | 107036751 | A | 8/2017 |
| CN | 110006558 | A | 7/2019 |
| CN | 112985671 | A | 6/2021 |
| RU | 2178074 | C2 | 1/2002 |

* cited by examiner

DAMAGE IDENTIFICATION METHOD BASED ON CABLE FORCE TESTS OF CABLE SYSTEM AND TEST ERROR SELF-ADAPTIVE ANALYSIS

CROSS REFERENCE TO RELATED APPLICATIONS

This application is a Continuation of PCT Application No. PCT/CN2021/136963, filed on Dec. 10, 2021; and this application claims priority of Application No. 202110204453.6 filed in China on Feb. 23, 2021, the entire contents of all of which are hereby incorporated by reference.

TECHNICAL FIELD

The present invention relates to the field of damage identification of cable forces of a prestressed cable, particularly to a method for conducting a cable dynamic test on a cable system by using a non-contact test method and determining the damage according to test results.

BACKGROUND

Prestressed tendons are widely used in cable-stayed bridges, suspension bridges, spatial prestressed steel structures and other long-span structures. As the most important supporting member in the structure, prestressed cables are featured by high stress and high strain energy. Local damage or fracture of cables or their supporting members will cause redistribution of internal forces of the full prestressed cable system and even the full structural system, and may even cause continuous collapse. Therefore, damage identification and location of in-service cables have always been a focus of engineering and scientific research.

For spatial large-span steel structures, since the number of cables is large and most of the cables are set at the height position of a roof, using the existing wired test methods requires contact installation of sensors and acquisition instruments. The demand for personnel and equipment is high, and the workload of one-by-one test is huge, which makes it difficult to achieve a full-range test of cable systems. On the other hand, the existing damage identification and analysis methods mostly focus on the component, analyzing the damage state of single component, which is difficult to be applied to the damage location and identification of a large-scale structural system such as a prestressed cable system.

In an article named *Research on Non-Contact Telemetry Technology of Cable-Stayed Cable Force Based on Radar* published in the third issue of Volume 47 of *World Bridge* in 2019, and in an article named *Test of Cable Force of Non-Contact Stay Cable on Taoyaomen Bridge* published in the fourth issue of *Bridge Maintenance and Operation* in 2020, radar non-contact equipment is adopted to conduct non-contact test on the stay cables of bridges.

However, the existing non-contact testing technology still stays in the two-dimensional plane, and the test analysis method still has limitations, which cannot guarantee accuracy of test results of the cable force and cannot carry out damage analysis and location.

SUMMARY OF THE INVENTION

Based on this, the present invention proposes a cable damage location and identification method based on the dynamic non-contact test and test error self-adaptive analysis of the cable system. A non-contact laser speed measuring equipment is adopted to carry out a full-range space test on the prestressed cable system, obtain three-dimensional vibration characteristics of the cable, carry out self-adaptive analysis based on the cable force error of the in-plane vertical and out-of-plane horizontal cable force analysis results, and determine a limit range of the cable force error, to further determine the abnormal cables beyond the limit range, and achieve damage location and identification.

To achieve the object of the invention of the present application, the present application adopts the following technical solution:

The present invention provides a damage identification method based on cable force tests of a cable system and test error self-adaptive analysis, and the method is used for measuring cable forces of a prestressed cable in prestressed steel structures, and determining the possible damage cable and zone through error self-adaptive analysis of the cable force, at least two tie rods are arranged between the end constraint points B and B' of the cable, and the tie rods constrain the cable in vertical direction, and the method includes the following steps:

(a) placing a laser velocimeter, arranging the laser velocimeter at a certain position outside the vertical measuring point plane S of the cable to be measured, such that a distance between a laser speed measuring point A at which the laser velocimeter is set and the point P to be measured of the cable between the two tie rods in the measuring point plane S is within a range of the laser velocimeter, and the point P to be measured of the cable is any point set on the cable to be measured between two tie rods;

(b) measuring the speed of a point P of the cable by using the laser velocimeter, measuring the speed of the point P of the cable in the measuring point plane S in real time a within a sampling duration by using the laser velocimeter, and drawing a speed-time curve of the point P of the cable;

(c) calculating the error rate $R_i$ of the cable force of each cable, converting the speed-time curve in step (b) into the speed-frequency curve through Fourier transform, finding out the first-order frequency $f_i$ and the second-order frequency $f_i$ of the cable in the speed-frequency curve, and calculating the cable force of the cable according to the following formulas:

$$F_{1i}=4\rho L_i^2 f_{1i}^2$$

$$F_{2i}=4\rho l_i^2 f_{2i}^2$$

where: $l_i$ is the shortest constraint distance between the tie rods set at both sides of the point P to be measured of the cable when the cable vibrates vertically in the measuring point plane S; mean($F_1$, $F_2$) is an average value of $F_1$ and $F_2$; $L_i$ is the shortest constraint distance between the constraint points B and B' when the cable vibrates laterally in the measuring point plane S; $\rho$ is a cable density, and $f_{2i} > f_{1i}$;

$$R_i = \frac{|F_{1i} - F_{2i}|}{\text{mean}(F_{1i}, F_{2i})}, i = 1, 2, \ldots n$$

where in the formula, i is a cable number in the steel structure, repeating steps (a) to (c) to obtain error rates $R_i$ of n cables respectively;

(d) finding out an error limit Q and an abnormal cable, collecting statistics of the error rates of the cables in the steel structure, and finding out an error limit Q and an abnormal cable with an error rate larger than the error limit Q through mathematical analysis;

(e) repeating steps (a) to (c), performing a secondary test on the abnormal cable in step (d), and recalculating the error rate of the abnormal cable, wherein if the error rate is smaller than the error limit Q, it is considered that the cable is undamaged, and if the error rate is larger than the error limit Q, it is considered that the cable or a constraint connection part of the cable is probably damaged and requires special attention.

The damage identification method based on cable force tests of a cable system and test error self-adaptive analysis of the present invention is provided, wherein in step (d), the error limit Q is calculated by a confidence interval method, including the following steps:

calculating an average value $R_{mean}=(R_1+R_2+\ldots+R_n)/n$ of an error rate data set $R_i$ of the cable of the cable system and a standard deviation $\sigma=\sqrt{((R_1-R_{mean})^2+(R_2-R_{mean})^2+\ldots+(R_n-R_{mean})^2)/n}$ of the error rates of the cables, where all error rate samples follow a distribution ($R_{mean}$, $\sigma$), and selecting a confidence interval of 95%, where $Q=R_{mean}+1.96\sigma/n$.

The damage identification method based on cable force tests of a cable system and test error self-adaptive analysis of the present invention is provided, wherein in step (d), the error limit Q is calculated by a self-adaptive clustering analysis method, including the following steps:

(i) setting two initial values:

selecting a maximum value $R_{max}$ and a minimum value $R_{min}$ in the error rate data set $R_i$ of the cable 1 of the cable system, and using the two values respectively as initial values $A_{10}^s$ and $A_{20}^s$ of central points of two data sets $A_1^s$ and $A_2^s$ to be classified, that is, $A_{10}^s=R_{max}$, $A_{20}^s=R_{min}$, $S=1$, S is a quantity of times of clustering, and performing clustering in step (ii) on the error rate data set $R_i$ according to the two initial values;

(ii) dividing the error rate data set $R_i$ into the set $A_1^s$ and the set $A_2^s$ when $|R_i-A_{10}^s|<|R_i-A_{20}^s|$, $R_i$ is added to the set $A_1^s$, otherwise $R_i$ is added to the set $A_2^s$; after all data has been clustered and classified, $A_1^s=[R_1, R_2, \ldots R_m]$, $A_2^s=[R_1', R_2', \ldots R_k']$, $m+k=n$, the superscript in $A_1$ and $A_2$ is the quantity of times of clustering, and the error data set $R_i$ includes $R_1, R_2, \ldots R_m, R_1', R_2', \ldots R_k'$;

(iii) calculating Euclidean distances of the two sets:

setting $d_1^0=0$; $d_2^0=0$ $$d_1^s = \sqrt{\sum_{m=1}^{m}(R_m - A_{10}^s)^2}$$

$$d_2^s = \sqrt{\sum_{k=1}^{k}(R_k' - A_{20}^s)^2}$$

(iv) finding out the new central points of the two sets calculating $\Delta_1^s=R_m-\text{mean}(A_1^s)$ corresponding to all the data points in $A_1^s$ until $\Delta_1^s$ is minimal, the corresponding $R_x$ is a new central point of the set $A_1^s$, in this case, $A_{10}^{s+1}=R_x$, where mean($A_1^s$) is an average error rate of the set $A_1^s$; calculating $\Delta_2^s=R_k'-\text{mean}(A_2^s)$ corresponding to all the data points in $A_2^s$ until $\Delta_2^s$ is minimal, corresponding $R_y'$ is a new central point of the set $A_2^s$, in this case, $A_{20}^{s+1}=R_y'$, where mean($A_2^s$) is an average error rate of the set $A_2^s$;

(v) determining whether the clustering converges when $d_1^s=d_1^{s-1}$ and $d_2^s=d_2^{s-1}$, considering that clustering analysis has converged, and proceeding to step (vi); otherwise, replacing $A_{10}^s$ with $A_{10}^{s+1}$, replacing $A_{20}^s$ with $A_{20}^{s+1}$, replacing S with S+1, and repeating steps (ii) to (iv);

(vi) obtaining an error limit obtaining the final cluster results of final cluster two sets, which are two sets $A_1^S$, $A_2^S$, and the corresponding central points $A_{10}^S$ and $A_{20}^S$, wherein when $A_{10}^S<A_{20}^S$, the error limit Q is equal to max($A_1^S$), that is, a maximum error rate in the set $A_1^S$; otherwise, the error limit Q is equal to max($A_2^S$), that is, a maximum error rate in the set $A_2^S$.

The damage identification method based on cable force tests of a cable system and error self-adaptive analysis of the present invention is provided, wherein a distance D between a laser speed measuring point A at which the laser velocimeter 4 is set and the point P to be measured of the cable 1 in the measuring point plane S satisfies the formula $D=\sqrt{h^2+d^2+b^2}$, where: a laser speed measuring plane T perpendicular to the measuring point plane S is drawn through the laser speed measuring point A, and b is a vertical distance from the laser speed measuring point A to the measuring point plane S in the laser speed measuring plane T; h is a vertical distance from the point P of the cable 1 to the laser speed measuring plane T in the measuring point plane S; and d is a distance between a projection point of the laser speed measuring point A in the measuring point plane S and a projection point of the point P of the cable 1 in the laser speed measuring plane T.

The damage identification method based on cable force tests of a cable system and error self-adaptive analysis of the present invention is provided, wherein a speed measurement accuracy of the laser velocimeter 4 is 1% of an estimated speed of the point P to be measured of the cable 1.

The damage identification method based on cable force tests of a cable system and error self-adaptive analysis of the present invention is provided, wherein a frequency accuracy of the laser velocimeter 4 is at least 0.005 Hz, and the sampling duration of the laser velocimeter 4 is at least 200 s.

The damage identification method based on cable force tests of a cable system and error self-adaptive analysis of the present invention is provided, wherein the sampling frequency of the laser velocimeter 4 is 5 to 30 times a natural vibration frequency of the cable 1.

The damage identification method based on cable force tests of a cable system and error self-adaptive analysis of the present invention is provided, wherein the sampling frequency of the laser velocimeter 4 is 256 Hz.

The damage identification method based on cable force tests of a cable system and error self-adaptive analysis of the present invention is provided, wherein a formula of the Fourier transform is as follows:

$$V[k] = \sum_{n=0}^{N-1} v[n]e^{-\frac{2\pi jkn}{N}},$$

where, v[n] is a speed time series measured by the laser velocimeter, n is a time step, which is equal to the reciprocal of the sampling frequency, N is a total quantity of speed data of a test time series, k is a frequency increment, which is equal to the reciprocal of the sampling duration, and through calculation using this formula, the speed time series v[n] is converted into a speed frequency series V[k], and j is a complex number.

Through the damage identification method based on cable force tests of a cable system and error self-adaptive analysis of the present invention, in-plane vertical and out-of-plane horizontal dynamic response characteristics can be obtained at the same time. On the one hand, the influence of concentrated mass, vertical support and other conditions can be eliminated, and on the other hand, the test results of the two directions can be mutually corroborated to ensure test accuracy and provide an effective basis for accurately evaluating the performance of prestressed steel structures, and through error self-adaptive analysis of the cable force, the cable prone to damage and a position of the cable are determined.

Compared with the non-contact test on a stay cable of a bridge using radar non-contact equipment in the article named *Research on Non-Contact Telemetry Technology of Cable-Stayed Cable Force Based on Radar* published in the third issue of Volume 47 of *World Bridge* in 2019 and in the article named *Test of Cable Force of Non-Contact Stay Cable on Taoyaomen Bridge* published in the fourth issue of *Bridge Maintenance and Operation* in 2020, the damage identification method based on cable force tests of a cable system and error self-adaptive analysis of the present invention has the following advantages:

1. In the above two documents, only displacement changes are under test, and the present invention focuses on speed changes. Compared with displacement, high-order vibration information contained in speed is more comprehensive, under the excitation of white noise, the cable vibration is small, and only using displacement time history data may lead to incomplete vibration signal acquisition and inaccurate test;

2. In the above two documents, the characteristics of the spatial vibration of the cable in the vertical and horizontal orthogonal directions are not taken into consideration, and only a single cable force value can be obtained, which does not have self-verified conditions, and cannot guarantee the accuracy of the test results, and cannot determine the cable prone to damage and a position of the cable, thereby providing an effective basis for cable forces test and damage identification of complex and complicated prestressed steel structures;

3. The above two documents both involve tests on the cable of a cable-stayed bridge. The stay cable is a special ideal structure with two ends being consolidated, with no concentrated mass and no tie rod support in the middle. For prestressed steel structures, a large number of cables of tension string structure and cable arch structure have concentrated mass or tie rod support and other auxiliary structures. When the methods of the above two documents are adopted, the influence of these influencing factors on the test and analysis of the cable force cannot be eliminated, therefore, the method is not feasible in the field of building structure.

4. Since the above two documents have the three limitations listed above, the cable forces and their errors in the vertical and horizontal orthogonal directions cannot be obtained by using the test methods in the documents, so the damage position cannot be found out through the cable force error analysis of the full-range big data.

It can be seen from the comparison that the test method and damage identification method in this document are innovative and self-contained, and play an important role in cable force evaluation and damage identification of prestressed steel structure cables in service.

BRIEF DESCRIPTION OF THE DRAWINGS

In FIG. 1, reference numeral 1 refers to a cable; reference numeral 2 refers to a tie rod; reference numeral 3 refers to a frame; reference numeral 4 refers to a laser velocimeter; reference numeral A is a laser speed measuring point; reference numeral P refers to the point to be measured of a cable; reference numeral S refers to the measuring point plane; reference numeral T refers to the laser speed measuring plane; reference numerals B and B' refer to end constraint points of the cable respectively.

DETAILED DESCRIPTION

Figure 1:
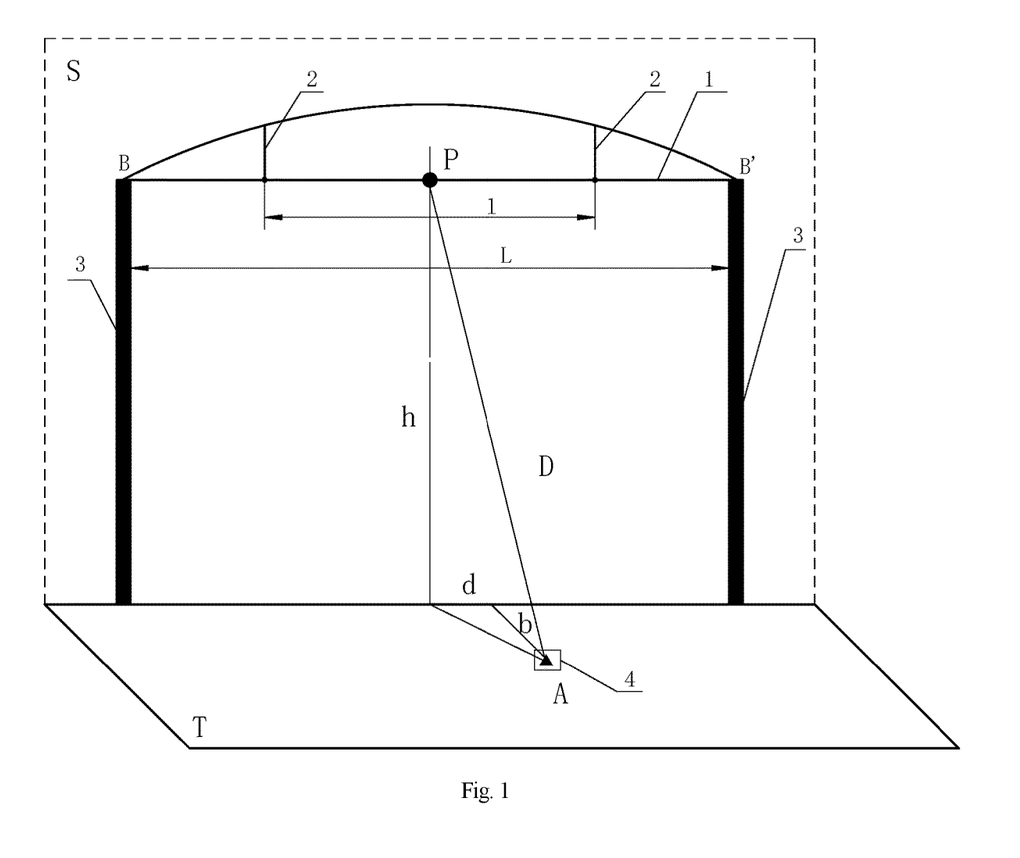
FIG. 1 shows a schematic diagram of a positional relationship between the frame, the cable, the tie rod and the laser velocimeter using the damage identification method based on the cable force test of a cable system and error self-adaptive analysis of the present invention.
Figure 2:
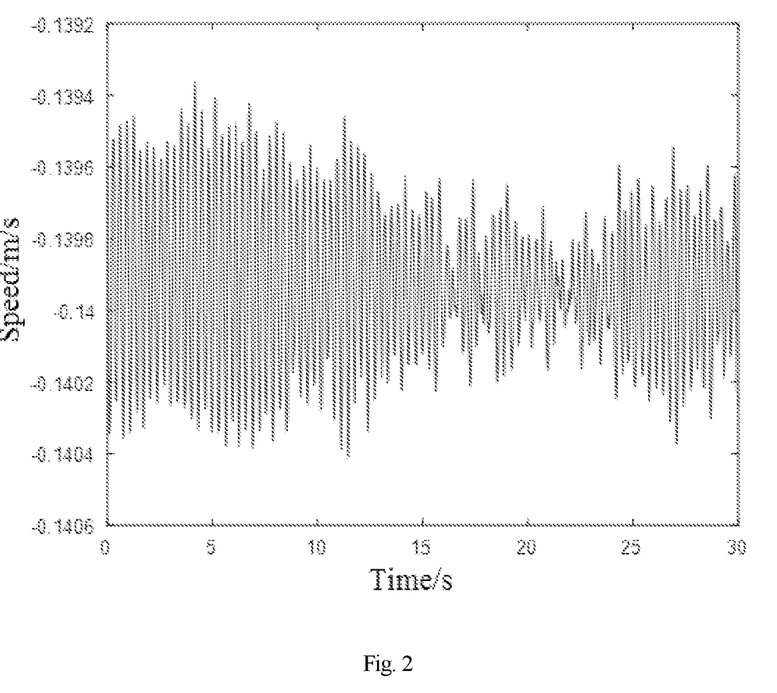
FIG. 2 shows the speed-time curve of the point P to be measured of the cable 1.
Figure 3:
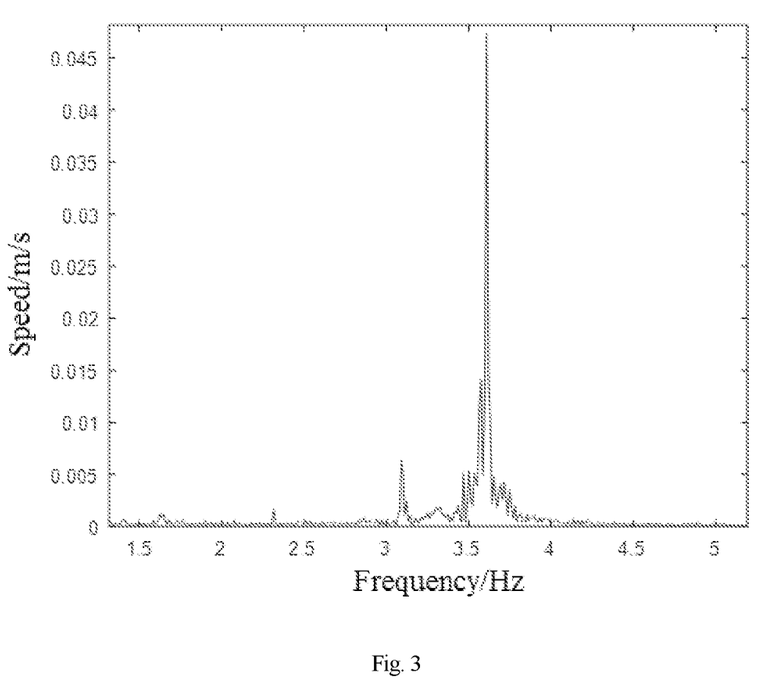
FIG. 3 shows the speed-frequency curve of the point to be measured of the cable after Fourier transform of the curve in FIG. 2.

As shown in FIG. 1, the damage identification method based on cable force tests of a cable system and error self-adaptive analysis of the present invention is used for measuring cable forces of a prestressed cable 1 in prestressed steel structures, and determining the possible damage cable and zone through error self-adaptive analysis of the cable force, at least two tie rods 2 are arranged between the end constraint points B and B' of the cable 1, and the tie rods 2 constrain the cable 1 in vertical direction, and the method includes the following steps:

(a) placing a laser velocimeter 4, arranging a laser velocimeter 4 at a certain position outside the vertical measuring point plane S of the cable 1 to be measured, such that a distance between a laser speed measuring point A at which the laser velocimeter 4 is set and the point P to be measured of the cable between the two tie rods 2 in the measuring point plane S is within a range of the laser velocimeter 4, as shown in FIG. 1, a distance D between a laser speed measuring point A at which the laser velocimeter 4 is set and the point P to be measured of the cable 1 in the measuring point plane S satisfies the formula $D=\sqrt{h^2+d^2+b^2}$, where: a laser speed measuring plane T perpendicular to the measuring point plane S is drawn through the laser speed measuring point A, and b is a vertical distance from the laser speed measuring point A to the measuring point plane S in the laser speed measuring plane T; h is a vertical distance from the point P of the cable 1 to the laser speed measuring plane T in the measuring point plane S; d is a distance between a projection point of the laser speed measuring point A in the measuring point plane S and a projection point of the point P of the cable 1 in the laser speed measuring plane T, and the point P to be measured of the cable is any point set on the cable 1 to be measured between two tie rods 2;

(b) measuring the speed of the point P of the cable 1 by using the laser velocimeter 4, measuring the speed of the point P of the cable 1 in the measuring point plane S in real time within a sampling duration by using the laser velocimeter 4, and drawing a speed-time curve of the point P of the cable 1;

(c) calculating the error rate $R_i$ of the cable force of each cable 1, the Fourier transform formula is as follows:

$$V[k] = \sum_{n=0}^{N-1} v[n]e^{-\frac{2\pi jkn}{N}}$$

where: $v[n]$ is a speed time series measured by the laser velocimeter, n is a time step, which is equal to the reciprocal of the sampling frequency, N is a total quantity of speed data of a test time series, k is a frequency increment, which is equal to the reciprocal of the sampling duration, and through calculation using this formula, the speed time series $v[n]$ is converted into a speed frequency series $V[k]$, and j is a complex number, wherein the method of Fourier transform analysis is introduced in details in Section 2.1 of Chapter 2 of *Fast Fourier transform and Its C Program*, which is published by China University of Science and Technology Press;

the speed-time curve in step (b) is converted into the speed-frequency curve through the above Fourier transform, the first-order frequency $f_{1i}$ and the second-order frequency $f_{2i}$ of the cable 1 are found out in the speed-frequency curve, and the cable force of the cable 1 is calculated according to the following formulas:

$$F_{1i}=4\rho L_i^2 f_{1i}^2$$

$$F_{2i}=4\rho l_i^2 f_{2i}^2$$

where, $l_i$ is the shortest constraint distance between the tie rods 2 set at both sides of the point P to be measured of the cable 1 when the cable 1 vibrates vertically in the measuring point plane S; mean $(F_1, F_2)$ is an average value of $F_1$ and $F_2$; $L_i$ is the shortest constraint distance between the two constraint points B and B' when the cable 1 vibrates laterally in the measuring point plane S; $\rho$ is a cable density, and $f_{2i}>f_{1i}$;

$$R_i = \frac{|F_{1i}-F_{2i}|}{\text{mean}(F_{1i}, F_{2i})}, i=1, 2, \ldots n$$

where, in the formula, i is a cable number in the steel structure, repeating steps (a) to (c) to obtain error rates $R_i$ of n cables 1 respectively;

(d) finding out an error limit Q and an abnormal cable 1, collecting statistics of the error rates of the cables in the steel structure, calculating the error limit Q by a confidence interval method, or finding out the error limit Q through a self-adaptive clustering analysis method, and identifying the abnormal cable 1 with an error rate larger than the error limit Q;

the confidence interval method is as follows: calculating the average value $R_{mean}=R_1+R_2+\ldots+R_n/n$ of the error rate data set $R_i$ of the cable 1 of the cable system and the standard deviation $\sigma=\sqrt{((R_1-R_{mean})^2+(R_2-R_{mean})^2+\ldots+(R_n-R_{mean})^2)/n}$ of each cable error rate, wherein the whole error rate samples follow the distribution $(R_{mean}, \sigma)$, and selecting a confidence interval of 95%, where $Q=R_{mean}+1.96\sigma/n$;

the self-adaptive clustering analysis method is as follows:

(i) setting two initial values:

selecting a maximum value $R_{max}$ and a minimum value $R_{min}$ in the error rate data set $R_i$ of the cable 1 of the cable system, and using the two values respectively as initial values $A_{10}^s$ and $A_{20}^s$ of central points of two data sets $A_1^s$ and $A_2^s$ to be classified, that is, $A_{10}^s=R_{max}$, $A_{20}^s=R_{min}$, S=1, where S is a quantity of times of clustering, and performing clustering in step (ii) on the error rate data set $R_i$ according to the two initial values;

(ii) dividing the error rate data set $R_i$ into the set $A_1^s$ and the set $A_2^s$ when $|R_i-A_{10}^s|<|R_i-A_{20}^s|$, $R_i$ is added to the set $A_1^s$, otherwise $R_i$ is added to the set $A_2^s$; after all data has been clustered and classified, $A_1^s=[R_1, R_2, \ldots R_m]$, $A_2^s=[R_1', R_2', \ldots R_k']$, m+k=n, the superscript in $A_1$ and $A_2$ is the quantity of times of clustering, and the error data set $R_i$ includes $R_1, R_2, \ldots R_m, R_1', R_2', \ldots R_k'$;

(iii) calculating Euclidean distances of the two sets:

setting $d_1^0=0$; $d_2^0=0$ $$d_1^s = \sqrt{\sum_{m=1}^{m}(R_m - A_{10}^s)^2}$$

$$d_2^s = \sqrt{\sum_{k=1}^{k}(R_k' - A_{20}^s)^2}$$

(iv) finding out the new central points of the two sets calculating $\Delta_1^s=R_m-\text{mean}(A_1^s)$ corresponding to all the data points in $A_1^s$ until when $\Delta_1^s$ is minimal, the corresponding $R_x$ is a new central point of the set $A_1^s$, in this case, $A_{10}^{s+1}=R_x$, where mean$(A_1^s)$ is an average error rate of the set $A_1^s$; and calculating $\Delta_2^s=R_k'-\text{mean}(A_2^s)$ corresponding to all the data points in $A_2^s$ until $\Delta_2^s$ is minimal, corresponding $R_y'$ is a new central point of the set $A_2^s$, in this case, $A_{20}^{s+1}=R_y'$, where mean$(A_2^s)$ is an average error rate of the set $A_2^s$;

(v) determining whether the clustering converges when $d_1^s=d_1^{s-1}$ and $d_2^s=d_2^{s-1}$, considering that clustering analysis has converged, and proceeding to step (vi); otherwise, replacing $A_{10}^s$ with $A_{10}^{s+1}$, replacing $A_{20}^s$ with $A_{20}^{s+1}$, replacing S with S+1, and repeating steps (ii) to (iv);

(vi) obtaining an error limit obtaining the final cluster results of final cluster two sets, which are two sets $A_1^S$, $A_2^S$, and the corresponding central points $A_{10}^S$ and $A_{20}^S$, wherein when $A_{10}^S<A_{20}^S$, the error limit Q is equal to $\max(A_1^S)$, that is, a maximum error rate in the set $A_1^S$; otherwise, the error limit Q is equal to $\max(A_2^S)$, that is, a maximum error rate in the set $A_2^S$;

(e) repeating steps (a) to (c), performing a secondary test on the abnormal cable 1 in step (d), and recalculating the error rate of the abnormal cable 1, wherein if the error rate is smaller than the error limit Q, it is considered that the cable 1 is undamaged, and if the error rate is larger than the error limit Q, it is considered that the cable 1 or a constraint connection part of the cable is probably damaged and requires special attention.

The low test accuracy of the laser velocimeter 4 will lead to insufficient analysis accuracy of test results and the inability to obtain accurate results. If the selected accuracy is too high, the sampling frequency needs to be increased, such that the amount of test data is increased, and the data analysis workload is huge and inefficient. Therefore, setting appropriate test parameters and accuracy is a prerequisite to achieving high-quality and efficient tests.

1. The speed measuring accuracy of the laser velocimeter 4

The displacement dynamic equation of free vibration of a single degree of freedom system structure is:

$$x(t)=e^{-\xi \omega t}(A \sin \omega_d t + B \cos \omega_d t) \quad \text{formula (1)}$$

In the formula, $\zeta$ is a structural damping ratio, $w_d$ is a fundamental frequency of the structure with damping, $\omega_d = \omega\sqrt{1-\xi^2}$, and A and B are parameters to be determined, which are related to an initial state.

Without considering an attenuation effect of damping, the displacement formula is simplified, to derive the speed and acceleration formulae as follows:

$$x(t)=A \sin \omega t + B \cos \omega t \quad \text{formula (2)}$$

$$x'(t)=A\omega \cos \omega t - B\omega \sin \omega t \quad \text{formula (3)}$$

$$x''(t)=[(-B\omega^2)\cos \omega t + (-A\omega^2)\sin \omega t] \quad \text{formula (4)}$$

where w is the circular frequency $\omega=2\pi f$ of the fundamental vibration frequency of the structure.

According to the above formula, Table 1 in which the relationship of the magnitude of displacement, speed, acceleration and structural frequency is summarized can be obtained. Generally, the natural vibration frequency of the cable is between 0.1 Hz and 10 Hz, and the acceleration response under the excitation of ambient vibration white noise is between 0 m/s² and 1 m/s². From this, the estimated range of speed can be obtained, and based on this, the speed accuracy setting of the non-contact laser speed testing equipment can be determined.

TABLE 1

Relationship of magnitude with acceleration as a target unit

| Structural frequency (Hz) | 0.1 | 1 | 10 |
| --- | --- | --- | --- |
| Displacement (mm) | 2533.0300 | 25.3300 | 0.2500 |
| Speed (mm/s) | 1591.5500 | 159.1500 | 15.9200 |
| Acceleration target (m/s²) | 1.0000 | 1.0000 | 1.0000 |

The speed measuring accuracy of the laser velocimeter 4 is 1% of the estimated speed of the point P to be measured of the cable.

2. Setting of Frequency Accuracy of the Laser Velocimeter 4

A frequency accuracy is related to the test duration when the vibration response is converted into the frequency domain. Its frequency accuracy can be represented as:

$$\Delta f = F/N \quad \text{formula (5)}$$

in the formula, F is a sampling frequency, N is the number of sampling points, and the number of sampling points is obtained by the product of sampling frequency and sampling duration, that is, N=F*T, therefore, a frequency accuracy is represented as:

$$\Delta f = 1/T \quad \text{formula (6)}$$

according to formula (6), a frequency accuracy and the sampling duration are reciprocal to each other. A frequency accuracy shall be at least 0.005 Hz, so the sampling duration shall be set to be at least 200 s.

3. Setting of Sampling Frequency of the Laser Velocimeter 4

According to Nyquist Law: in the process of analog/digital signal conversion, when the sampling frequency fs·max is 2 times larger than the highest frequency Fmax in the signal, that is, fs·max>=2Fmax, the sampled digital signal completely retains the information in the original signal, and the original analog signal can be restored without distortion.

In order to ensure test correctness of the structural frequency, it is necessary to take at least 5-30 times the sampling frequency of the structural frequency. For cables whose natural vibration frequency is generally smaller than 10 Hz, the sampling frequency is 256 Hz.

INDUSTRIAL APPLICABILITY

Through the damage identification method based on cable force tests of a cable system and error self-adaptive analysis of the present invention, in-plane vertical and out-of-plane horizontal dynamic response characteristics can be obtained at the same time. On the one hand, the influence of concentrated mass, vertical support and other conditions can be eliminated, and on the other hand, the test results of the two directions can be mutually corroborated to ensure test accuracy and provide an effective basis for accurately evaluating the performance of prestressed steel structures, and through error self-adaptive analysis of the cable force, the cable prone to damage and a position of the cable are determined, so the damage identification method in the present invention has important economic and social values.

The above described embodiments only describe the preferred embodiments of the present invention, and do not limit the scope of the present invention. Without departing from the design spirit of the present invention, various modifications and improvements made by those skilled in the art to the technical solution of the present invention shall all fall within the protection scope determined by the claims of the present invention.

The invention claimed is:

1. A damage identification method based on cable force tests of a cable system and test error self-adaptive analysis, wherein the method is used for measuring cable force of prestressed cables in prestressed steel structures and determining the possible damage cable and zone through test error self-adaptive analysis of cable forces, at least two tie rods are arranged between the end constraint points of the cable, the tie rods constrain the cable in vertical direction, and the method comprises the following steps:

(a) placing a laser velocimeter:
arranging the laser velocimeter at a certain position outside the vertical measuring point plane of the cable, such that a distance between a laser speed measuring point at which the laser velocimeter is set and a point to be measured of the cable between the two tie rods in the measuring point plane is within a range of the laser velocimeter, the point to be measured of the cable being any point set on the cable to be measured between the two tie rods;

(b) measuring the speed of the point of the cable by using the laser velocimeter measuring the speed of the point of the cable in the measuring point plane (S) in a sampling duration by using the laser velocimeter, and drawing a speed-time curve of the point of the cable;

(c) calculating error rates $R_i$ of cable forces of cables:
converting the speed-time curve in step (b) into a speed-frequency curve through Fourier transform, finding out the first-order frequency $f_{1i}$ and the second-order frequency $f_{2i}$ of the cable in the speed-frequency curve, and calculating the cable force of the cable according to the following formulas:

$$F_{1i}=4\rho L_i^2 f_{1i}^2$$

$$F_{2i}=4\rho l_i^2 f_{2i}^2$$

where, $l_i$ is the shortest constraint distance between the tie rods set on two sides of the point of the cable when the cable vibrates vertically in the measuring point plane; $L_i$ is the shortest constraint distance between the two constraint points when the cable vibrates laterally in the measuring point plane; ρ is a cable density, and $f_{2i} > f_{1i}$; mean $(F_1, F_2)$ is an average value of $F_1$ and $F_2$;

$$R_i = \frac{|F_{1i} - F_{2i}|}{\text{mean}(F_{1i}, F_{2i})}, i = 1, 2, \ldots, n$$

where, in the formula, i is a cable number in the steel structure, repeating steps (a) to (c) to obtain error rates $R_i$ of n cables respectively;

(d) finding out an error limit Q and an abnormal cable:

collecting statistics of the error rates of the cables in the steel structure, and finding out the error limit Q and the abnormal cable with an error rate larger than the error limit Q through mathematical analysis; and (e) repeating steps (a) to (c), performing a secondary test on the abnormal cable in step (d), and recalculating the error rate of the abnormal cable, wherein if the error rate is smaller than the error limit Q, it is considered that the cable is undamaged, and if the error rate is larger than the error limit Q, it is considered that the cable or a constraint connection part of the cable is probably damaged and requires special attention.

2. The damage identification method based on cable force tests of a cable system and test error self-adaptive analysis of claim 1, wherein in step (d), the error limit Q is calculated by a confidence interval method, comprising the following steps:

calculating an average value $R_{mean} = (R_1 + R_2 + \ldots + R_n)/n$ of an error rate data set $R_i$ of the cable of the cable system and a standard deviation $\sigma = \sqrt{((R_1 - R_{mean})^2 + (R_2 - R_{mean})^2 + \ldots + (R_n - R_{mean})^2)/n}$ of the error rates of the cables, wherein all error rate samples follow a distribution $(R_{mean}, \sigma)$, and selecting a confidence interval of 95%, where $Q = R_{mean} + 1.96\sigma/n$.

3. The damage identification method based on cable force tests of a cable system and test error self-adaptive analysis of claim 1, wherein in step (d), the error limit Q is calculated by a self-adaptive clustering analysis method, comprising the following steps:

(i) setting two initial values:

selecting a maximum value $R_{max}$ and a minimum value $R_{min}$ in the error rate data set $R_i$ of the cable of the cable system, and using the two values respectively as initial values $A_{10}^s$ and $A_{20}^s$ of central points of two data sets $A_1^s$ and $A_2^s$ to be classified, that is, $A_{10}^s = R_{max}$, $A_{20}^s = R_{min}$, S=1, where S is a quantity of times of clustering, and performing clustering in step (ii) on the error rate data set $R_i$ according to the two initial values;

(ii) dividing the error rate data set $R_i$ into the set $A_1^s$ and the set $A_2^s$:

when $|R_i - A_{10}^s| < |R_i - A_{20}^s|$, $R_i$ is added to the set $A_1^s$, otherwise $R_i$ is added to the set $A_2^s$; after all data has been clustered and classified, $A_1^s = [R_1, R_2, \ldots, R_m]$, $A_2^s = [R_1', R_2', \ldots, R_k']$, m+k=n, the superscript in $A_1$ and $A_2$ is the quantity of times of clustering, and the error rate data set $R_i$ includes $R_1, R_2, \ldots, R_m, R_1', R_2', \ldots,$ and $R_k'$;

(iii) calculating Euclidean distances of the two sets: setting $d_1^0 = 0$; $d_2^0 = 0$ $$d_1^s = \sqrt{\sum_{m=1}^{m} (R_m - A_{10}^s)^2}$$

$$d_2^s = \sqrt{\sum_{k=1}^{k} (R_k' - A_{20}^s)^2}$$

(iv) finding out new central points of the two sets:

calculating $\Delta_1^s = R_m - \text{mean}(A_1^s)$ corresponding to all data points in $A_1^s$ until $\Delta_1^s$ is minimal, the corresponding $R_x$ is a new central point of the set $A_1^s$, in this case, $A_{10}^{s+1} = R_x$, where $\text{mean}(A_1^s)$ is an average error rate of the set $A_1^s$; calculating $\Delta_2^s = R_k' - \text{mean}(A_2^s)$ corresponding to all the data points in $A_2^s$ until $\Delta_2^s$ is minimal, corresponding $R_y'$ is a new central point of the set $A_2^s$, in this case, $A_{20}^{s+1} = R_y'$, where $\text{mean}(A_2^s)$ is an average error rate of the set $A_2^s$;

(v) determining whether the clustering converges:

when $d_1^S = d_1^{S-1}$ and $d_2^S = d_2^{S-1}$, considering that clustering analysis has converged, and proceeding to step (vi); otherwise, replacing $A_{10}^S$ with $A_{10}^{S+1}$, replacing $A_{20}^S$ with $A_{20}^{S+1}$, replacing S with S+1, and repeating steps (ii) to (iv); and (vi) obtaining an error limit:

obtaining the final cluster results of final cluster two sets, which are two sets $A_1^S$, $A_2^S$ and the corresponding central points $A_{10}^S$ and $A_{20}^S$, wherein when $A_{10}^S < A_{20}^S$, the error limit Q is equal to $\max(A_1^S)$, that is, a maximum error rate in the set $A_1^S$; otherwise, the error limit Q is equal to $\max(A_2^S)$, that is, a maximum error rate in the set $A_2^S$.

4. The damage identification method based on cable force tests of a cable system and test error self-adaptive analysis of claim 2, wherein a distance D between a laser speed measuring point at which the laser velocimeter is set and the point to be measured of the cable in the measuring point plane satisfies the formula $D = \sqrt{h^2 + d^2 + b^2}$, wherein a laser speed measuring plane perpendicular to the measuring point plane is drawn through the laser speed measuring point, and b is a vertical distance from the laser speed measuring point to the measuring point plane in the laser speed measuring plane; h is a vertical distance from the point of the cable to the laser speed measuring plane in the measuring point plane; and d is a distance between a projection point of the laser speed measuring point in the measuring point plane and a projection point of the point of the cable in the laser speed measuring plane.

5. The damage identification method based on cable force tests of the cable system and test error self-adaptive analysis of claim 4, wherein the speed measurement accuracy of the laser velocimeter is 1% of an estimated speed of the point to be measured of the cable.

6. The damage identification method based on cable force tests of a cable system and test error self-adaptive analysis of claim 5, wherein a frequency accuracy of the laser velocimeter is at least 0.005 Hz, and the sampling duration of the laser velocimeter is at least 200 s.

7. The damage identification method based on cable force tests of a cable system and test error self-adaptive analysis of claim 6, wherein a sampling frequency of the laser velocimeter is 5 to 30 times of the natural vibration frequency of the cable.

8. The damage identification method based on cable force tests of a cable system and test error self-adaptive analysis of claim 7, wherein the sampling frequency of the laser velocimeter is 256 Hz.

9. The damage identification method based on cable force tests of a cable system and test error self-adaptive analysis of claim 8, wherein a formula of the Fourier transform is as follows:

$$V[k] = \sum_{n=0}^{N-1} v[n] e^{-\frac{2\pi jkn}{N}},$$

where v[n] is a speed time series measured by the laser velocimeter, n is a time step, which is equal to the reciprocal of the sampling frequency, N is a total quantity of speed data of a test time series, k is a frequency increment, which is equal to the reciprocal of the sampling duration, and through calculation using this formula, the speed time series v[n] is converted into a speed frequency series V[k], and j is a complex number.

* * * * *